Figure 1:
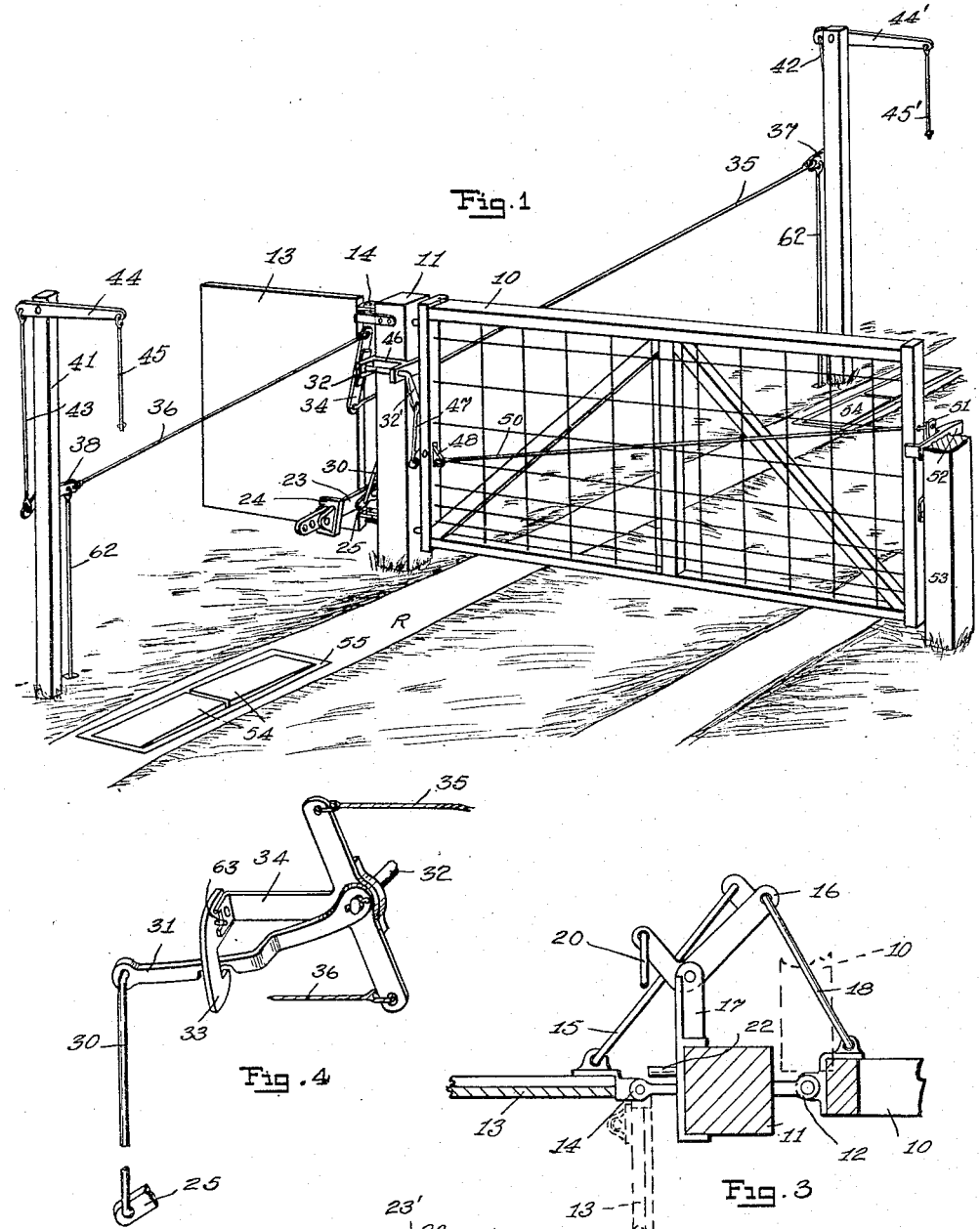

M. DILORENZO.
GATE.
APPLICATION FILED APR. 20, 1915.
1,177,937.
Patented Apr. 4, 1916.
2 SHEETS—SHEET 2.
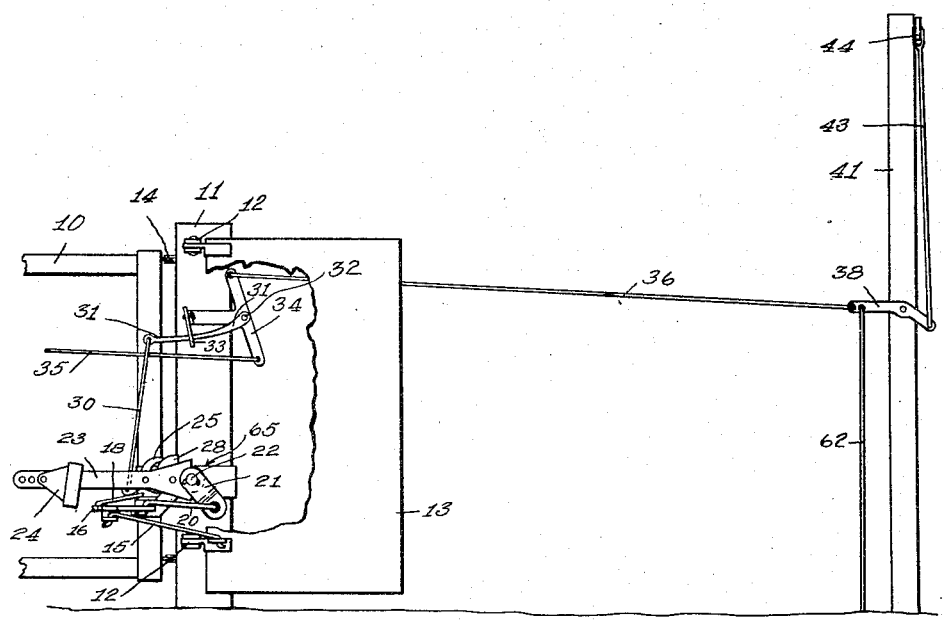
Fig. 2
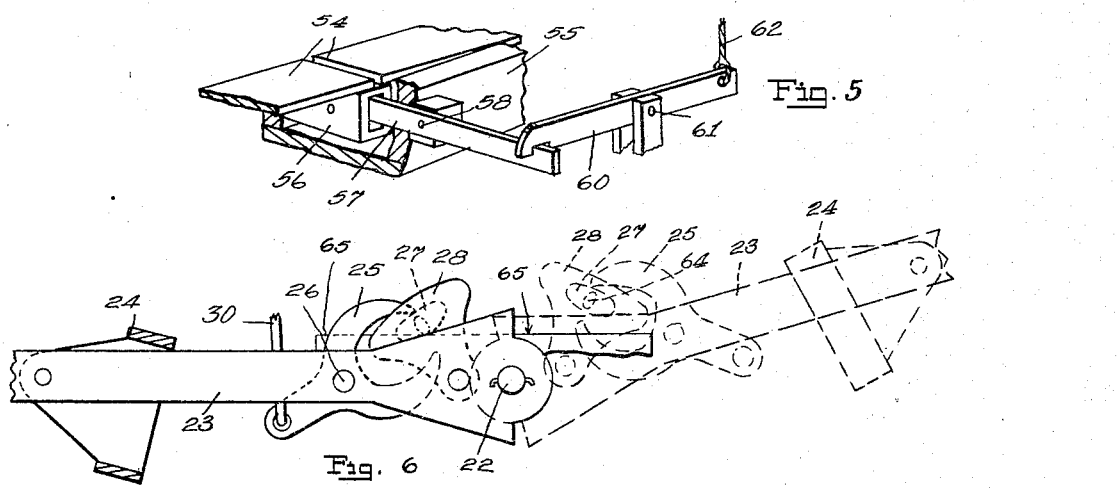
Fig. 5
Fig. 6
Fig. 7
WITNESSES:
E. Peterson
J. C. Matheny
INVENTOR
Michael Dilorenzo
BY
Pierre Barnes
ATTORNEY

UNITED STATES PATENT OFFICE.

MICHAEL DILORENZO, OF IRONDALE, WASHINGTON.

GATE.

1,177,937.     Specification of Letters Patent.     Patented Apr. 4, 1916.

Application filed April 20, 1915. Serial No. 22,553.

*To all whom it may concern:*

Be it known that I, MICHAEL DILORENZO, a citizen of the United States, residing at Irondale, in the county of Jefferson and State of Washington, have invented certain new and useful Improvements in Gates, of which the following is a specification.

This invention relates to improvements in gates, and is an improvement on the gate shown and described in United States Letters Patent No. 1,076,960, issued to me on Oct. 10, 1913.

The object of this invention is to simplify and render more efficient the operating mechanism of the gate, whereby such gate may be opened or closed by a person at a distance therefrom.

A further object is to provide a gate-operating mechanism that may be easily installed on farm gates of the usual type.

A still further object is to provide automatic means for opening and closing the gate in response to the passage of a vehicle over a gate trip that is located in the road at a short distance from the gate.

A still further object is to provide a wind counterbalance whereby the gate will open or close quickly and easily against a heavy wind.

The invention consists in the novel construction of gate-opening mechanism and the novel adaptation and combination of parts as will be more fully described in the following specification, illustrated in the accompanying drawings and finally pointed out in the appended claims.

Referring to the accompanying drawings, Figure 1 is a view in perspective of a gate constructed in accordance with my invention as it appears when closed; Fig. 2 is a fragmentary view in side elevation of the same as it appears when it is open; Fig. 3 is a view partly in cross section and partly in plan illustrating mechanism connecting the gate with a wind counterbalance; Fig. 4 is a detached view in perspective of a portion of the gate operating mechanism; Fig. 5 is a fragmentary view in perspective of a portion of the automatic gate-trip; Fig. 6 is an enlarged view in side elevation of a detail; Fig. 7 is an enlarged view in perspective of another detail, and Fig. 8 is an enlarged fragmentary view of still another detail of the invention.

Referring to the drawings throughout which like reference numerals indicate like parts, the numeral 10 indicates a gate and 11 is a post to which such gate may be connected by hinges 12.

13 is a wind counterbalance that is secured by hinges 14 to the post 11 opposite the gate 10 and is connected by a link 15 with one end of a bell-crank shaped arm 16 that is fulcrumed in a bracket 17 and is connected by a link 18 with the gate 10, as shown in Fig. 3, whereby the gate 10 and counterbalance 13 are caused to swing simultaneously. The opposite end of the bell-crank 16 is connected by a link 20 with the outer end of the actuating member 21 that is fulcrumed on a stud pin 22 and operatively connected with a weight arm 23 that carries a weight 24 and is fulcrumed on the same pin 22, as more clearly shown in Fig. 8, whereby, when the weight arm 23 is oscillated on the pin 22, as hereinafter explained, the member 21 will oscillate therewith and will move the bell-crank 16 to open or close the gate.

The weight arm 23 is provided with a forked lifting member 25 mounted on a pivot 26 and adapted to engage with the edge of a cam 27 provided on a member 28 that is articulated with the arm 23, as more clearly shown in Fig. 6. The outer end of the lifting member 23 is connected by a link 30 with an arm 31 that is loosely mounted on a shaft 32 and is adapted to be engaged by a hook 33 pivotally secured to one arm of a T-shaped member 34 that is rigidly mounted on the shaft 32 and has flexible connectors as cables or wires 35 and 36 secured to the ends of its other two arms.

The outer ends of the cables 35 and 36 are secured to one end of angular lever arms 37 and 38, respectively, that are pivoted on posts 40 and 41 and have their opposite ends connected by cables 42 and 43 with fulcrumed cross-arms 44 and 44[1] that project outwardly over the road R and are provided with jerk ropes 45 and 45[1] that hang downwardly whereby they may easily be reached by a person within a vehicle or on horseback.

The shaft 32 is mounted in a bracket 46 on the post 11 and has one end 32[1] formed at right angles to the axis of the shaft and connected by a cable 47 with the end of a bell-crank 48 that is fulcrumed on the gate 10 and has its opposite end connected by a cable 50 with a spring plate 51 that is adapted to engage with a hook 52 on an outer gate-post 53 to lock the gate 10 in a closed position, the spring 51 being adapted to be released from engagement with the hook 52 when the shaft 32 is rotated.

In Fig. 5 is illustrated automatic operating means for the gate 10 that may be placed in the road R in the path of the wheels of a vehicle to be operated thereby, such means consisting in two planks 54 disposed in an end to end position in a frame 55 with their abutting ends supported on a block 56 that is articulated with a lever 57 fulcrumed on a pin 58 and engaging beneath one end of another lever arm 60 that is fulcrumed on a pin 61 and is connected by a cable 62 with the angular lever arm 37 or 38 as the case may be, one of these devices being provided at each side of the gate in order that the gate may be operated automatically by vehicles approaching or leaving. The planks 54 are placed at a sufficient distance from the gate 10 to allow room for the gate to open in front of an approaching vehicle after the wheels of the vehicle have passed onto and depressed the planks 54, and the block 56 is adapted to rest on the bottom of the frame 55 when the planks are depressed. When a pull is exerted on one of the ropes 45 or a pressure is exerted on one of the planks 54, the cable 35 or 36 will become taut and will turn the T-shaped member 34 on its pivot, which member 34 will act through the arm 31 and link 30 to lift the weight arm 23 upwardly until such weight arm passes a vertical position and is thrown over onto the opposite side of the post 11, whereupon the weight 24 acting through the weight arm 23 will turn the same about its pivot 22 and the member 21 will be engaged by a shoulder 23¹ on the arm 23 and will act through the link 20 to turn the bell-crank 16 and swing the gate 10 and counterbalance 13 on their hinges to open the gate. The gate is closed in the same manner by throwing the weight arm 23 over past center and permitting the weight to close the gate. The weight 24 is loosely mounted on the arm 23 so that it will neutralize the recoil and prevent such arm from rebounding when it is thrown over quickly and forcibly, and is brought to a stop shortly after passing the vertical position by the member 21 and the link 20. The hook 33 is held in position by a pin 63 which admits of a limited movement thereof and such hook releases the arm 31 as soon as the weight arm 23 passes center and permits the weight arm to move downwardly and open or close the gate even though the tension on the cable 35 or 36 is maintained for some time. The cam 27 is provided with an outwardly projecting stud 64 that engages with the top edge of a bar 65 when the weight arm is lowered to bring the member 28 into a position where the cam 27 may be engaged by the point of the forked lifting element 25 on the next operation, as more clearly shown in Fig. 6, thus the point of connection of the link 30 with the member 25 is always below the center line of the arm 23 when it is being lifted whereby such arm 23 may be advanced beyond its dead center in the direction in which it is traveling, the weight 24 then moving downwardly by gravity and furnishing the motive power for opening or closing the gate.

What I claim, is—

1. A structure of the class described, comprising a support, a gate pivotally mounted on said support, a weighted lever-arm fulcrumed on said support, a bell-crank, a link connecting said bell-crank with said lever-arm, another link connecting said bell-crank with said gate, and means operable at a distance from said gate for lifting said lever-arm whereby said weight may actuate said bell-crank to swing said gate on its pivots.

2. A structure of the class described, comprising a support, a swinging gate pivotally mounted on said support, a weighted lever arm fulcrumed on said support and adapted to be oscillated in a vertical plane upon its fulcrum, a bell-crank articulated with said support, a link connecting one end of said bell-crank with the bottom end of said lever arm, another link connecting the opposite end of said lever-arm with said gate, and means operated by the weight of an approaching vehicle for lifting said weighted lever arm past a vertical center position and permitting said weight to lower said lever-arm by gravity and swing said gate in a horizontal plane.

3. A structure of the class described, comprising a support, a gate hinged to said support, a lever-arm adapted to be oscillated in a vertical plane, a weight loosely mounted on the outer end of said lever-arm, a bell-crank, links connecting said bell-crank with said lever-arm and said gate, means for locking said gate in a closed position, mechanism for lifting said weight arm past its upright dead center position, and devices connected with said lifting mechanism for releasing said gate-lock when said lever-arm is lifted.

4. A structure of the class described, comprising a swinging gate that is hinged to a support, a lever-arm mounted for oscillation on said support, means connecting said lever-arm with said gate whereby the oscillation of said lever-arm will swing said gate in a horizontal plane, a weight loosely articulated with the outer end of said lever-arm to neutralize recoil when said lever is oscillated from one side to the other of its fulcrum, and means for lifting said weight arm past its vertical dead center position.

5. A structure of the class described, comprising a gate post, a gate swingingly secured to said gate post, a wind counterbalance hinged to said gate post, a bell-crank pivoted on said gate-post, links connecting said wind counterbalance and said gate with one end of said bell-crank, and operating means connected with the opposite end of said bell-crank whereby said gate and said wind counterbalance may be caused to swing simultaneously.

6. A structure of the class described, comprising a support, a gate hinged to said support, a lever-arm fulcrumed on said support, a weight loosely articulated with the outer end of said lever-arm, means connecting said lever-arm with said gate for swinging said gate when said lever-arm is oscillated, a forked member articulated with said lever-arm, a cam for securing said forked member in an inclined position with respect to said lever-arm, said cam being adapted to change its position to shift said forked member at each oscillation of said lever-arm whereby said lever-arm may be lifted past its vertical dead center position, and means connected with said forked member for lifting said weight arm.

7. A structure of the class described, comprising a gate-post, a gate hinged thereon, a bell-crank lever having one end connected with said gate, a lever-arm, a weight loosely secured to the outer end of said lever-arm, an actuating member pivotally connected with the lower end of said lever and adapted to engage therewith, a link connecting said actuating member with said bell-crank, a forked member pivoted on said lever arm, a cam articulated with said lever arm to secure said forked member in an inclined position with respect to said lever-arm, said cam being adapted to change its position to shift said forked member at each oscillation of said lever-arm whereby the outer end of said forked member will be below said lever-arm, and a cable connected with the outer end of said forked member to lift said lever-arm.

Signed at Seattle, Washington, this 8th day of April, 1915.

MICHAEL DILORENZO.

Witness:
E. PETERSON.

Copies of this patent may be obtained for five cents each, by addressing the "Commissioner of Patents, Washington, D. C."